(12) United States Patent
Hirokawa et al.

(10) Patent No.: US 9,891,138 B2
(45) Date of Patent: Feb. 13, 2018

(54) PRESSURE SENSOR

(71) Applicant: NGK SPARK PLUG CO., LTD., Nagoya-shi, Aichi (JP)

(72) Inventors: Toshiki Hirokawa, Nagoya (JP); Hiroshi Harada, Tajimi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 204 days.

(21) Appl. No.: 14/836,515

(22) Filed: Aug. 26, 2015

(65) Prior Publication Data

US 2016/0076971 A1    Mar. 17, 2016

(30) Foreign Application Priority Data

Aug. 27, 2014 (JP) .................................. 2014-172465
Aug. 19, 2015 (JP) .................................. 2015-161688

(51) Int. Cl.
*G01M 15/08* (2006.01)
*F23Q 7/00* (2006.01)

(52) U.S. Cl.
CPC ............. *G01M 15/08* (2013.01); *F23Q 7/001* (2013.01); *F23Q 2007/005* (2013.01)

(58) Field of Classification Search
CPC ............... F23Q 7/001; F23Q 2007/005; F23Q 2007/002; G01L 23/10; F02P 19/028; G01M 15/08
See application file for complete search history.

(56) References Cited

U.S. PATENT DOCUMENTS 8,205,490 B2* 6/2012 Mueller .................. G01L 23/10
                                                    73/114.16
8,250,909 B2* 8/2012 Kern ....................... F23Q 7/001
                                                    73/114.16
(Continued)

FOREIGN PATENT DOCUMENTS

DE    102011087641 A1    6/2013
DE    102012202058 A1    8/2013
(Continued)

OTHER PUBLICATIONS

Communication dated Mar. 23, 2016, from the European Patent Office in counterpart application No. 15182045.3.

*Primary Examiner* — Freddie Kirkland, III
(74) *Attorney, Agent, or Firm* — Sughrue Mion, PLLC

(57) ABSTRACT

A pressure sensor including a rod-shaped member, a tubular housing, a variable member and a pressure measuring element. The variable member is entirely disposed within the housing, is connected to the housing and the rod-shaped member, and deforms when the rod-shaped member is displaced relative to the housing along an axial direction. The variable member includes a first portion connected to the rod-shaped member, a second portion connected to the housing, and a bent portion which connects the first portion and the second portion to each other and has a bent shape. A portion of the second portion is a pressure receiving portion which displaces the rod-shaped member in the axial direction when receiving a pressure. The pressure receiving portion of the second portion has a substantially uniform thickness, and the thickness of the pressure receiving portion of the second portion is larger than that of the first portion.

8 Claims, 5 Drawing Sheets

(56) References Cited

U.S. PATENT DOCUMENTS

| | | | |
|---|---|---|---|
| 8,893,545 B2* | 11/2014 | Nakamura | G01M 15/08 73/114.18 |
| 8,939,121 B2* | 1/2015 | Nishiyuki | F23Q 7/001 123/145 A |
| 9,068,549 B2* | 6/2015 | Suzuki | F23Q 7/00 |
| 9,347,854 B2* | 5/2016 | Nishiyuki | G01M 15/08 |
| 9,500,365 B2* | 11/2016 | Maier-Schleich | G01L 19/0645 |
| 2010/0037698 A1 | 2/2010 | Kern | |
| 2012/0227477 A1 | 9/2012 | Borgers et al. | |
| 2013/0042831 A1* | 2/2013 | Nishiyuki | G01L 23/10 123/145 A |
| 2013/0319094 A1* | 12/2013 | Nakamura | G01M 15/08 73/114.19 |
| 2015/0027213 A1 | 1/2015 | Maier-Schleich et al. | |
| 2015/0047592 A1* | 2/2015 | Watanabe | G01L 23/221 123/145 A |
| 2015/0048066 A1 | 2/2015 | Maeda et al. | |
| 2015/0114095 A1* | 4/2015 | Hatta | B23K 15/0006 73/114.18 |
| 2016/0061683 A1* | 3/2016 | Nishiyuki | F23Q 7/001 73/114.19 |

FOREIGN PATENT DOCUMENTS

| | | |
|---|---|---|
| JP | 4487853 B2 | 6/2010 |
| JP | 2012-88307 A | 5/2012 |
| WO | 2013/117414 A1 | 8/2013 |
| WO | 2013157269 A1 | 10/2013 |

* cited by examiner

PRESSURE SENSOR

TECHNICAL FIELD

The present invention relates to a pressure sensor.

BACKGROUND ART

A glow plug is known which is mounted on an internal combustion engine and in which a sensor for measuring the pressure in a combustion chamber is incorporated in a housing. In an example of a structure for achieving such pressure measurement, a rod-shaped heater is configured to be displaced in an axial direction in response to pressure, and the displacement of the rod-shaped heater is detected. In order to ensure airtightness between the heater and the housing while a displacement of the heater is achieved to a detectable degree in this method, a configuration is known in which the heater and the housing are connected to each other by a variable member (elastic portion). Such a glow plug is configured such that, when the variable member receives a pressure, an axial force is exerted to the rod-shaped heater (e.g., Patent Document 1).

PRIOR ART DOCUMENT

Patent Document

[Patent Document 1] Japanese Patent No. 4487853

SUMMARY OF THE INVENTION

Problems to be Solved by the Invention

With combustion of fuel, a soot component occurs in the combustion chamber. The soot component is, for example, soot, HC, or the like, and is generated from combustion gas. The generated soot component enters a gap formed between the variable member and another member (the housing, etc.), and adheres to and accumulates on the surface of each member. In particular, if a gap between the variable member and another member is narrow, adhesion and accumulation of the soot component becomes remarkable. When the soot component adheres and accumulates in the gap as described above, almost no pressure is transmitted to the gap, so that the pressure receiving area of a portion (hereinafter, referred to as "pressure receiving portion") of the variable member which portion is deformed by receiving a pressure (pressure reception) decreases. Thus, there is a problem that, along with operation of the internal combustion engine, the pressure receiving area of the variable member in the glow plug decreases, resulting in a change in pressure measurement sensitivity (hereinafter, referred to as "sensitivity change").

In order to suppress a sensitivity change, forming the entire variable member with a large thickness to enhance the rigidity of the variable member is considered. However, if the entire variable member is formed with a large thickness, there is a problem that the size and the weight of the variable member increase, so that the size and the weight of the pressure sensor increase. The above-described problem is not limited to a glow plug with a pressure sensor, but is common in general pressure sensors having a similar mechanism.

Means for Solving the Problems

The present invention is intended to solve the above-described problems, and can be embodied in the following modes.

(1) According to one mode of the present invention, a pressure sensor is provided which includes: a rod-shaped member extending along an axial direction; a tubular housing within which the rod-shaped member is disposed in a state where a front end of the rod-shaped member projects therefrom; a variable member disposed entirely within the housing, connected to the housing and the rod-shaped member, and configured to deform when the rod-shaped member is displaced relative to the housing along the axial direction; and an element, disposed at a rear side with respect to the variable member and within the housing, for measuring a pressure around the front end of the rod-shaped member on the basis of the displacement, wherein: the variable member includes a first portion connected to the rod-shaped member, a second portion connected to the housing, and a bent portion which connects the first portion and the second portion to each other and has a bent shape; and at least a portion of the second portion is a pressure receiving portion which displaces the rod-shaped member in the axial direction when receiving the pressure. In the pressure sensor, the pressure receiving portion of the second portion has a substantially uniform thickness, and the thickness of the pressure receiving portion of the second portion is larger than that of the first portion. According to this mode, since the pressure receiving portion of the second portion is thick, the rigidity of the pressure receiving portion is increased. Thus, a sensitivity change due to accumulation of a soot component is suppressed. In addition, since the first portion is thinner than the pressure receiving portion of the second portion, an increase in the size and the weight of the variable member can be suppressed. The second portion may be connected directly to the housing not via another member, or may be connected indirectly to the housing via another member.

(2) In the above mode, the rod-shaped member may be a heater which generates heat when being energized. According to this mode, the pressure sensor can be used as a glow plug with a pressure sensor.

(3) In the above mode, the bent portion may be the pressure receiving portion, and the bent portion may have a substantially uniform thickness smaller than the thickness of the pressure receiving portion of the second portion. According to this mode, since the bent portion is thin, an excessive increase in the rigidity of the pressure receiving portion is suppressed, so that measurement sensitivity becomes favorable.

(4) In the above mode, the bent portion may be the pressure receiving portion, and the bent portion may have a thickness which gradually decreases from a connection portion with the second portion to a connection portion with the first portion. According to this mode, since the thickness of the bent portion gradually changes, the boundary between the first portion and the bent portion can be formed in a smooth shape.

(5) In the above mode, the housing may include a housing body portion at a front side in the axial direction, and a tubular housing tube portion which is disposed with a gap from an inner wall of the housing body portion and has a rear end connected to the housing body portion; the variable member may be connected to the housing tube portion; a rear end portion of the variable member may extend from the front side of the gap toward the rear side of the gap; a position of the connection between the housing tube portion and the variable member in the axial direction may be a position shifted from a rear end of the gap toward the front side by a predetermined length or a position at the front side with respect to the position shifted by the predetermined length; and the predetermined length may be a length which is 50% of a length of the gap in the axial direction. According to this mode, the position of the connection between the housing tube portion and the variable member in the axial direction is the central position of the gap or the position at the front side with respect to the central position. Whereas a portion of the variable member at the front side with respect to the position of the connection with the housing tube portion functions as a pressure receiving portion, a portion of the variable member at the rear side with respect to the position of the connection does not function as a pressure receiving portion. Thus, by providing the position of the connection between the housing tube portion and the variable member at the central position of the gap in the axial direction or at the front side with respect to the central position, the variable member located at the rear side of the gap in which a soot component is likely to adhere and accumulate can be disabled to function as a pressure receiving portion. Therefore, in the pressure sensor, a sensitivity change due to adhesion and accumulation of the soot component at the variable member is suppressed.

(6) In the above mode, the variable member may be formed by deep drawing. According to this mode, the variable member can be produced at low cost.

The present invention can be embodied in various forms other than the above. For example, the present invention can be embodied in the form of a glow plug with a pressure sensor.

MODES FOR CARRYING OUT THE INVENTION

Figure 1:
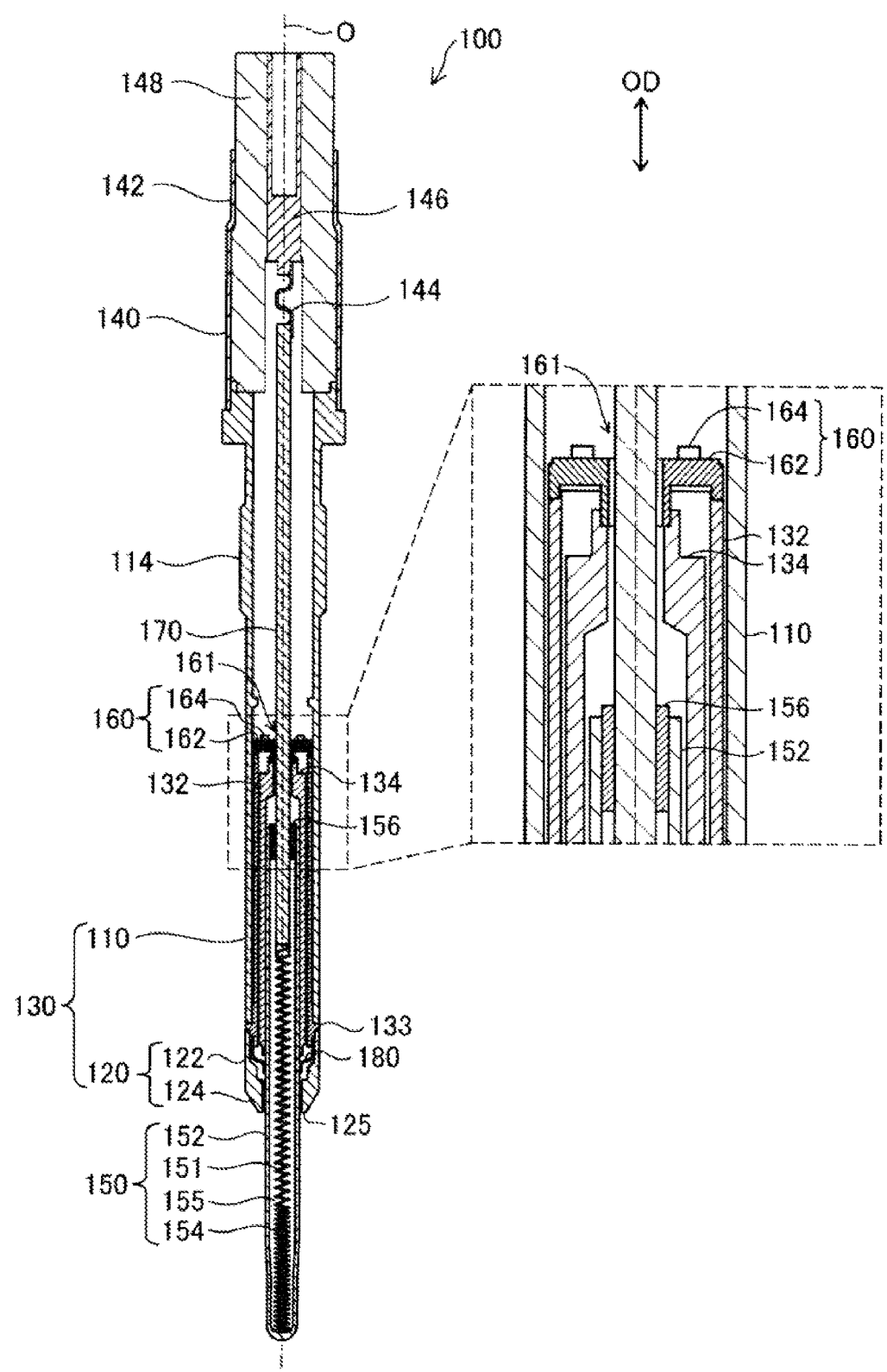
FIG. 1 Cross-sectional view of a glow plug.

Embodiment 1 will be described. FIG. 1 is a cross-sectional view of a glow plug 100. The lower side of an axis O of the glow plug 100 in FIG. 1 is defined as a front side of the glow plug 100, and the upper side of the axis O is defined as a rear side of the glow plug 100. A direction along the axis O of the glow plug 100 is defined as an axial direction OD.

As shown in FIG. 1, the glow plug 100 includes: a tubular housing 130 including a metallic shell 110 and a cap portion 120 (the metallic shell 110 and the cap portion 120 correspond to a "housing body portion" in CLAIMS); a heater portion 150; a pressure sensor 160; a protection tube 140; a terminal spring 144; a metal terminal 146; and a connector member 148. FIG. 1 also shows the vicinity of the pressure sensor 160 in an enlarged manner.

The metallic shell 110 which is a component of the housing 130 is a substantially cylindrical metal member formed from carbon steel or stainless steel. A screw portion 114 for fixing the glow plug 100 to a cylinder head of a diesel engine is formed near the rear end of the metallic shell 110. The screw portion 114 has a screw groove (not shown), and the glow plug 100 is fixed to the diesel engine by screwing the screw groove into a plug-mounting hole of the cylinder head (not shown).

The protection tube 140 of the glow plug 100 is made of a metal and has electrical conductivity. The material of the protection tube 140 in the present embodiment is stainless steel (e.g., SUS410, SUS630, etc.). The protection tube 140 is formed in a cylindrical shape extending along the axial direction OD. The protection tube 140 is joined to a rear end portion of the housing 130. The metal terminal 146 is held via the connector member 148 at the inner side of the protection tube 140. At a rear end portion of the protection tube 140, a tool engagement portion 142 is formed which is engageable with a tool (not shown) which is used for fixing and detaching the glow plug 100 to and from the diesel engine.

The connector member 148 of the glow plug 100 has an electrical insulation property. The material of the connector member 148 in the present embodiment is an insulating resin. The connector member 148 is formed in a cylindrical shape. The metal terminal 146 is fixed at the inner side of the connector member 148.

The terminal spring 144 of the glow plug 100 is made of a metal and has electrical conductivity. The material of the terminal spring 144 in the present embodiment is, for example, a copper alloy or the like. The terminal spring 144 mechanically and electrically connects between a center shaft 170 and the metal terminal 146 and also absorbs a displacement of the center shaft 170 occurring with a displacement of the heater portion 150. The terminal spring 144 in the present embodiment is a curved plate spring.

The metal terminal 146 of the glow plug 100 is made of a metal and has electrical conductivity. The material of the metal terminal 146 in the present embodiment is, for example, a copper alloy or the like.

The cap portion 120 is disposed at the front end of the metallic shell 110. The cap portion 120 is an annular metal member formed from carbon steel or stainless steel. At the rear side of the cap portion 120, a cylindrical portion 122 is formed which has a thickness smaller than that of a front portion of the metallic shell 110 and has an outer diameter substantially equal to that of the metallic shell 110. At the front side of the cap portion 120, a tapered portion 124 is formed which has an outer diameter reduced toward a front end thereof.

The heater portion 150 is disposed within the housing 130 in a state where the front end of the heater portion 150 projects therefrom. The heater portion 150 includes a sheath tube 152, a heat generation coil 154, a control coil 151, and insulating powder 155. The sheath tube 152 is a tubular member extending along the axial direction OD, has a closed hemispheric front end, and has an opened rear end within the metallic shell 110. The sheath tube 152 is formed from stainless steel or the like which is excellent in heat resistance and corrosion resistance.

Each of the heat generation coil 154 and the control coil 151 is a winding resistor which resists and generates heat when being energized, and is held within the front side of the sheath tube 152. The center shaft 170 which is a rod-shaped member made of a metal is inserted in the heater portion 150, and the rear end of the control coil 151 is fixed to the front end of the center shaft 170. The front end of the heat generation coil 154 is fixed to the front end of the sheath tube 152. The heat generation coil 154 and the control coil 151 are supplied with power from the outside through the metal terminal 146, the terminal spring 144, and the center shaft 170. A gap between the heat generation coil 154 and the control coil 151, and the sheath tube 152 is filled with the insulating powder 155 which is magnesium oxide or the like having heat resistance.

A seal member 156 for sealing the insulating powder 155 within the sheath tube 152 is inserted between the center shaft 170 and the opened rear end of the sheath tube 152. The sheath tube 152 is subjected to swaging. Due to the swaging, the insulating powder 155 filling the interior of the sheath tube 152 becomes dense to improve the efficiency of heat conduction. The rear side of the heater portion 150 is disposed within the metallic shell 110. The front side of the heater portion 150 is disposed so as to project from an opening portion 125 of the cap portion 120 toward the front side in the axial direction OD.

Within the housing 130, the annular pressure sensor 160 disposed at the rear side with respect to the heater portion 150, a sensor fixing member 132 for fixing the pressure sensor 160 within the housing 130, a transmission sleeve 134 for transmitting a displacement of the heater portion 150 along the axial direction OD to the pressure sensor 160, and a variable member 180 for connecting the outer periphery of the heater portion 150 to the inner side of the housing 130, are provided.

The sensor fixing member 132 is a substantially cylindrical member formed from stainless steel or the like. The sensor fixing member 132 is disposed along the inner periphery of the metallic shell 110, and has a collar-shaped flange portion 133 formed at a front end portion thereof. The flange portion 133 is welded to the front end surface of the metallic shell 110. An outer peripheral portion of the pressure sensor 160 is welded to the rear end of the sensor fixing member 132. The sensor fixing member 132 fixes the pressure sensor 160 at a position near the center portion of the housing 130.

The transmission sleeve 134 is a substantially cylindrical member formed from stainless steel or the like. The transmission sleeve 134 is disposed between the sensor fixing member 132 and the heater portion 150. The front end of the transmission sleeve 134 is welded to the outer periphery of the heater portion 150 at a position near the position at which the flange portion 133 of the sensor fixing member 132 is formed. Meanwhile, the rear end of the transmission sleeve 134 is welded to an inner peripheral portion of the annular pressure sensor 160. A displacement of the heater portion 150 along the axial direction OD is transmitted to the inner peripheral portion of the pressure sensor 160 by the transmission sleeve 134.

The variable member 180 is a substantially tubular member having elasticity. The variable member 180 is formed from a material such as stainless steel or a nickel alloy by deep drawing. The material of the variable member 180 is INCONEL 718 (INCONEL is a registered trademark). The variable member 180 is entirely disposed within the housing 130, a rear end portion of the variable member 180 is welded to the front end of the sensor fixing member 132, and a front end portion of the variable member 180 is welded to the outer periphery of the heater portion 150 (sheath tube 152). The heater portion 150 is connected to the housing 130 by the variable member 180, and a displacement of the heater portion 150 along the axial direction OD is permitted by elastic deformation of the variable member 180. The variable member 180 also serves to ensure airtightness within the metallic shell 110 by connecting the heater portion 150 and the housing 130 to each other. The structure of the variable member 180 will be described in detail later.

The pressure sensor 160 is disposed within the housing 130 and at the rear side with respect to the heater portion 150 and the variable member 180, and includes: an annular metal diaphragm 162 provided at its center with an opening portion 161 through which the center shaft 170 extends; and a piezoresistor 164 joined to the upper surface (rear side surface) of the metal diaphragm 162.

The metal diaphragm 162 is formed from, for example, stainless steel or the like. An integrated circuit (not shown) provided at a predetermined portion within the housing 130 is electrically connected to the piezoresistor 164. As described above, the rear end of the transmission sleeve 134 connected to the heater portion 150 is joined to the inner periphery of the metal diaphragm 162. Thus, when the heater portion 150 receives a pressure (combustion pressure) within a combustion chamber to be displaced along the axial direction OD, an amount of the displacement is transmitted to the metal diaphragm 162 by the transmission sleeve 134 to deform the metal diaphragm 162.

The integrated circuit detects the deformation of the metal diaphragm 162 on the basis of a change in the resistance value of the piezoresistor 164, thereby detecting the combustion pressure of an internal combustion engine. The integrated circuit outputs an electric signal indicating the combustion pressure detected thus, to an external ECU or the like through a wire inserted in the rear end of the metallic shell 110.

Figure 2:
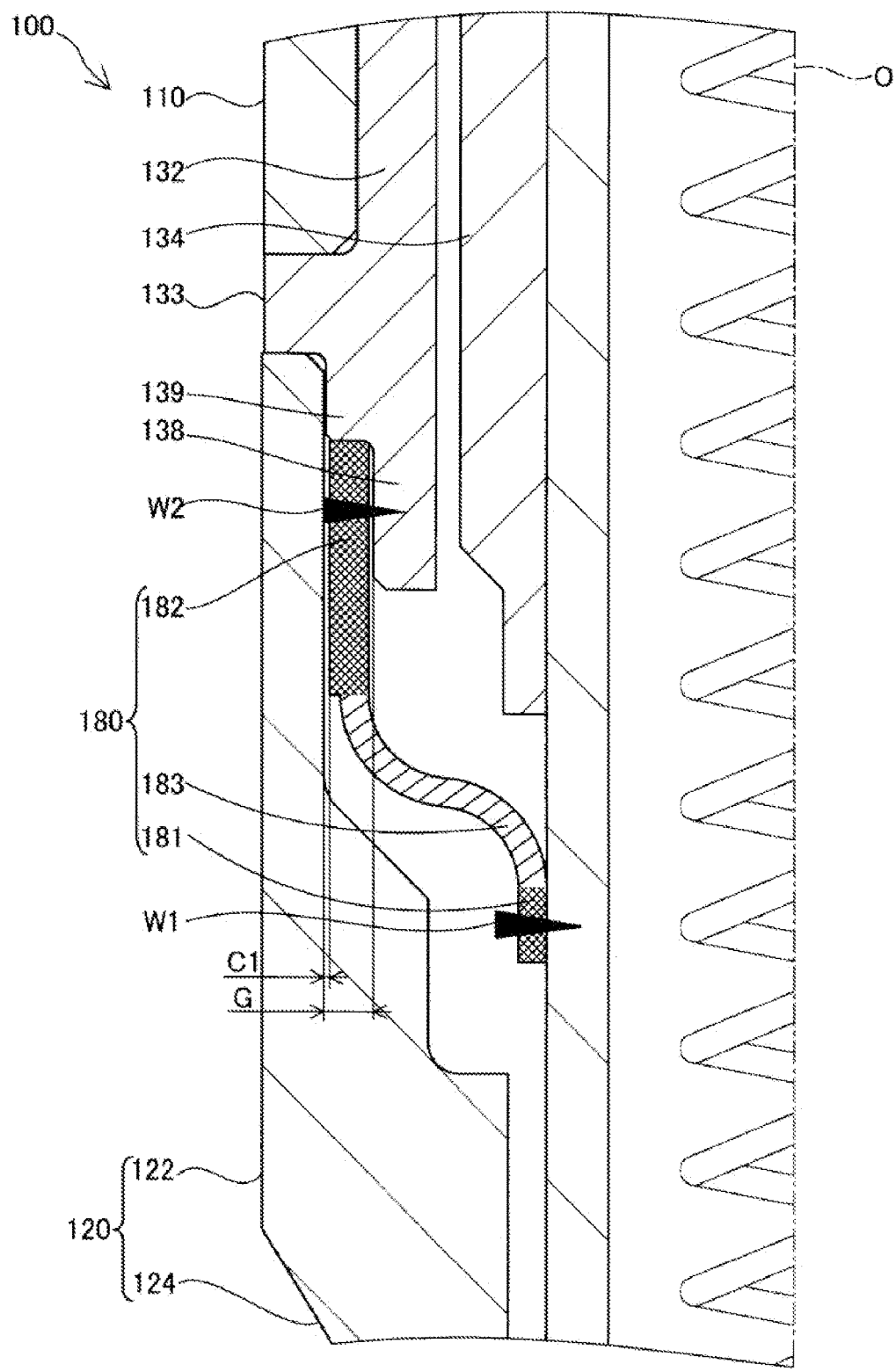
FIG. 2 Cross-sectional view of a variable member and its vicinity.

FIG. 2 is a cross-sectional view of the variable member 180 and its vicinity. The variable member 180 includes a first portion 181, a second portion 182, and a bent portion 183. The first portion 181 is formed in a substantially cylindrical shape extending along the axial direction OD, and is connected to the heater portion 150 by being laser-welded over the entire circumference of the first portion 181 (a welded portion W1). The second portion 182 is formed in a substantially cylindrical shape extending along the axial direction OD, and is connected to the housing 130 via a gap forming portion 138 (corresponding to a "housing tube portion" in CLAIMS) of the sensor fixing member 132 by being laser-welded over the entire circumference of the second portion 182 (a welded portion W2). The gap forming portion 138 is a substantially cylindrical portion of the sensor fixing member 132 which portion is at the front side with respect to the flange portion 133 and faces an inner wall of the cylindrical portion 122 of the cap portion 120 to form a gap G. The bent portion 183 is a portion which has a bent shape and connects the first portion 181 and the second portion 182 to each other. A front end portion of the second portion 182, that is, the boundary between the second portion 182 and the bent portion 183, is located at the front side with respect to the front end of the gap forming portion 138.

A clearance C1 is formed between the inner peripheral surface of the cylindrical portion 122 and the outer peripheral surface of the second portion 182. A soot component adheres and accumulates in the clearance C1 as combustion of fuel is repeated.

As shown in FIG. 2, a step portion 139 having an outer diameter larger than that of the gap forming portion 138 is formed between the gap forming portion 138 and the flange portion 133 of the sensor fixing member 132. The front end surface of the step portion 139 is a flat surface which is located at the frontmost side in the step portion 139 and is orthogonal to the axis O. The front end surface of the step portion 139 defines the rear end of the gap G, and an end portion of the second portion 182 is in contact with the front end surface of the step portion 139.

Figure 3:
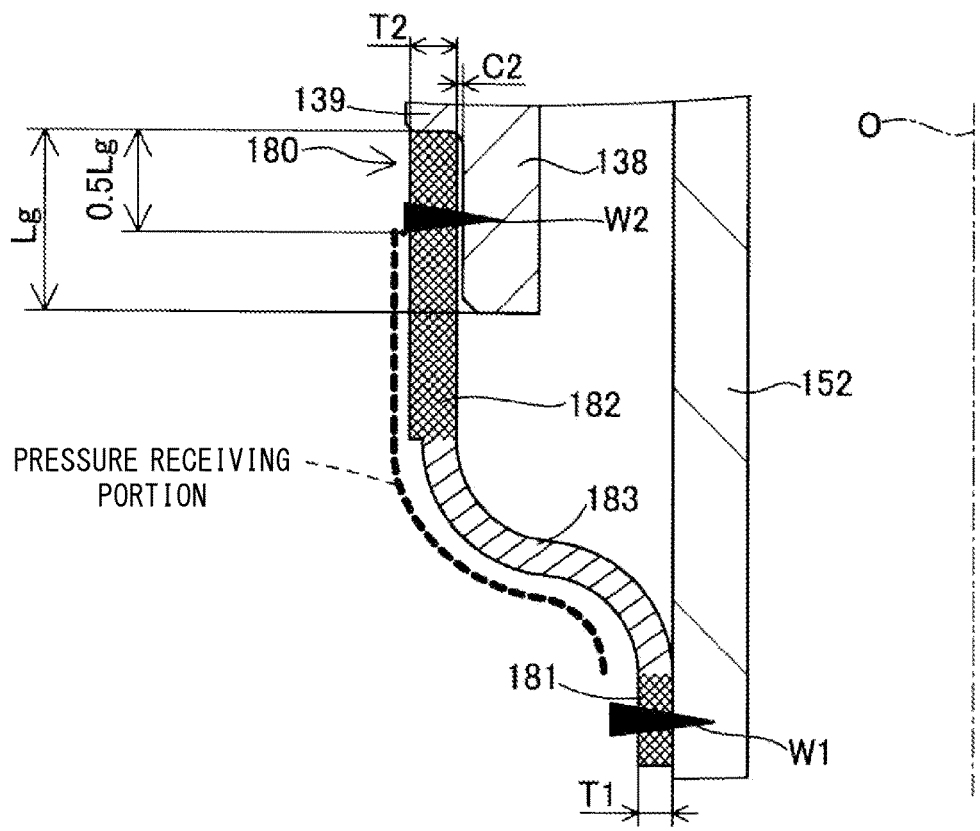
FIG. 3 Cross-sectional view of a gap forming portion, a part of a sheath tube, and the variable member.

FIG. 3 is a cross-sectional view of the gap forming portion 138, a part of the sheath tube 152, and the variable member 180. As shown in FIG. 3, the first portion 181 and the second portion 182 extend straight in parallel to the axial direction OD. The thickness of each of the first portion 181, the second portion 182, and the bent portion 183 is substantially uniform. The thicknesses of the first portion 181 and the bent portion 183 are a thickness T1, and the thickness of the second portion 182 is a thickness T2. The thickness T2 is larger than the thickness T1. The thickness being substantially uniform means that a manufacturing tolerance or a variation by deformation caused due to use is permitted. In the present embodiment, in the case where the difference between a maximum value and a minimum value of the thickness is within a range of ±5%, the thickness is substantially uniform.

As shown in FIG. 3, a portion of the second portion 182 and the bent portion 183 are a pressure receiving portion. The pressure receiving portion is a portion of the variable member 180 which portion deforms when receiving the combustion pressure, to displace the heater portion 150 in the axial direction OD. The pressure receiving portion of the second portion 182 is a portion at the front side with respect to the welded portion W2. Even if a portion of the second portion 182 at the rear side with respect to the welded portion W2 receives the combustion pressure and deforms, transmission of influence of the deformation to the portion of the second portion 182 at the front side with respect to the welded portion W2 is blocked by the welded portion W2. Thus, even if receiving the combustion pressure, the portion of the second portion 182 at the rear side with respect to the welded portion W2 does not influence a displacement of the heater portion 150 in the axial direction OD. In Embodiment 1, the position of the connection by the welded portion W2 is a position shifted from the front end surface of the step portion 139 toward the front side by a length which is 50% of the length Lg of the gap forming portion 138 in the axial direction OD, with the front end surface of the step portion 139 as a reference. In Embodiment 1 and Embodiments 2 and 3 described later, the position of the front end of the welded portion W2 is defined as the position of the connection by the welded portion W2.

A clearance C2 is formed between the gap forming portion 138 and the second portion 182. Since the clearance C2 is formed, the second portion 182 is deformable radially inward (a direction toward the axis O) even at its portion whose position in the axial direction OD overlaps that of the gap forming portion 138. Thus, the second portion 182 functions as a pressure receiving portion even at its portion whose position in the axial direction OD overlaps that of the gap forming portion 138, if the portion is at the front side with respect to the welded portion W2.

It is assumed that no soot component has accumulated at the pressure receiving portion of the second portion 182 shown in FIG. 3. Of the pressure receiving portion of the second portion 182, a portion at which the soot component accumulates in the clearance C1 does not function as a pressure receiving portion since the combustion pressure is not transmitted therethrough.

According to Embodiment 1 described above, even if the soot component accumulates in the clearance C1, a sensitivity change (a change in pressure detection sensitivity) is suppressed. The pressure receiving portion of the second portion 182 is thicker and more rigid than the first portion 181. Thus, even if no soot component accumulates in the pressure receiving portion of the second portion 182 and the pressure receiving portion of the second portion 182 functions as a pressure receiving portion, the pressure receiving portion does not deform much and thus does not contribute much to a displacement of the heater portion 150 in the axial direction OD. Therefore, even if the second portion 182 no longer functions as a pressure receiving portion due to accumulation of the soot component, the influence of the second portion 182 on a displacement of the heater portion 150 in the axial direction OD does not change much. As a result, a sensitivity change of the pressure sensor 160 is suppressed before and after accumulation of the soot component.

Since the first portion 181 and the bent portion 183 are formed so as to be thinner than the second portion 182 while the rigidity of the second portion 182 is increased as described above, an increase in the size and the weight of the entire variable member 180 is suppressed. In addition, since the bent portion 183 is formed so as to be thinner than the second portion 182, the rigidity of the bent portion 183 is decreased, so that the measurement sensitivity becomes favorable.

Figure 4:
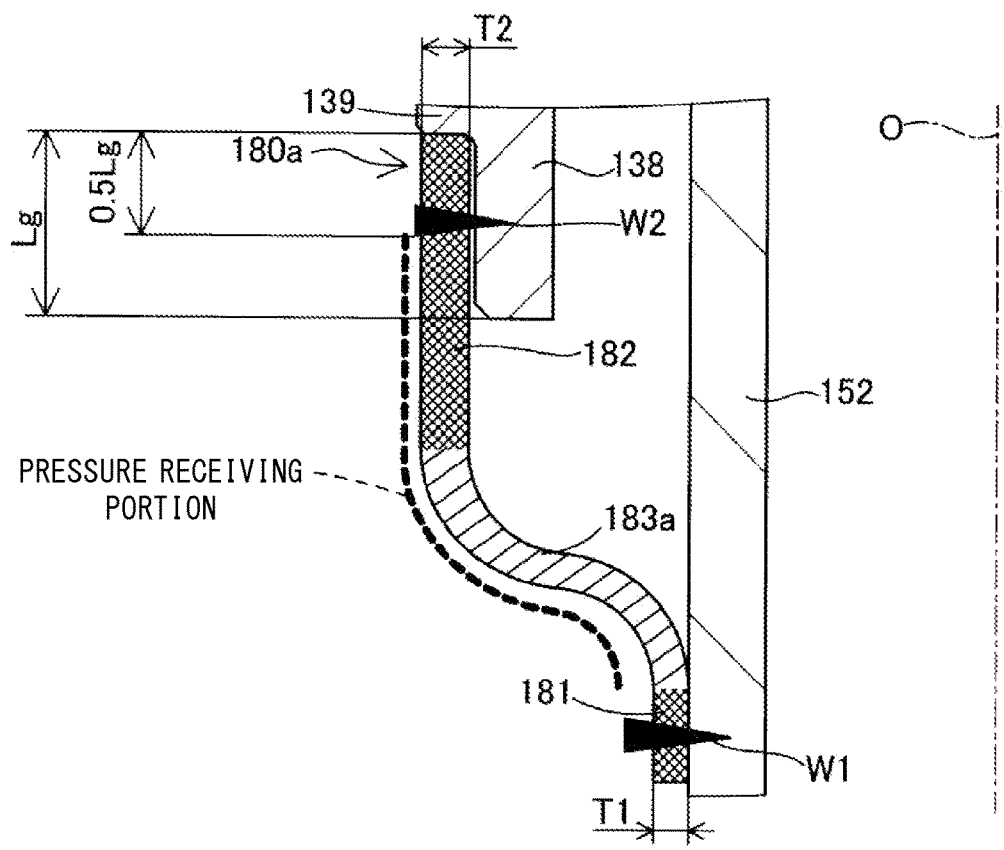
FIG. 4 Cross-sectional view of a gap forming portion, a part of a sheath tube, and a variable member (Embodiment 2).

Embodiment 2 will be described. FIG. 4 is a cross-sectional view of the gap forming portion 138, a part of the sheath tube 152, and a variable member 180a. The variable member 180a is used instead of the variable member 180 of the embodiment 1. A glow plug of Embodiment 2 is the same as the glow plug 100 of Embodiment 1 except for the variable member 180a.

As shown in FIG. 4, the variable member 180a includes a bent portion 183a having a shape different from that of the bent portion 183 of Embodiment 1. As shown in FIG. 4, a thickness of the bent portion 183a at the boundary with the first portion 181 is a thickness T1, and a thickness of the bent portion 183a at the boundary with the second portion 182 is a thickness T2. The thickness of the bent portion 183a gradually changes from the boundary with the first portion 181 to the boundary with the second portion 182.

According to Embodiment 2 in which the variable member 180a is used, the boundary between the second portion 182 and the bent portion 183a can be formed in a smooth shape while a sensitivity change is suppressed similarly to the embodiment 1. In addition, stress concentration on a portion whose thickness changes in a discontinuous manner can be prevented.

In Embodiment 2 as well, the position of the connection by the welded portion W2 is a position shifted from the front end surface of the step portion 139 toward the front side by a length which is 50% of the length Lg, with the front end surface of the step portion 139 as a reference.

Figure 5:
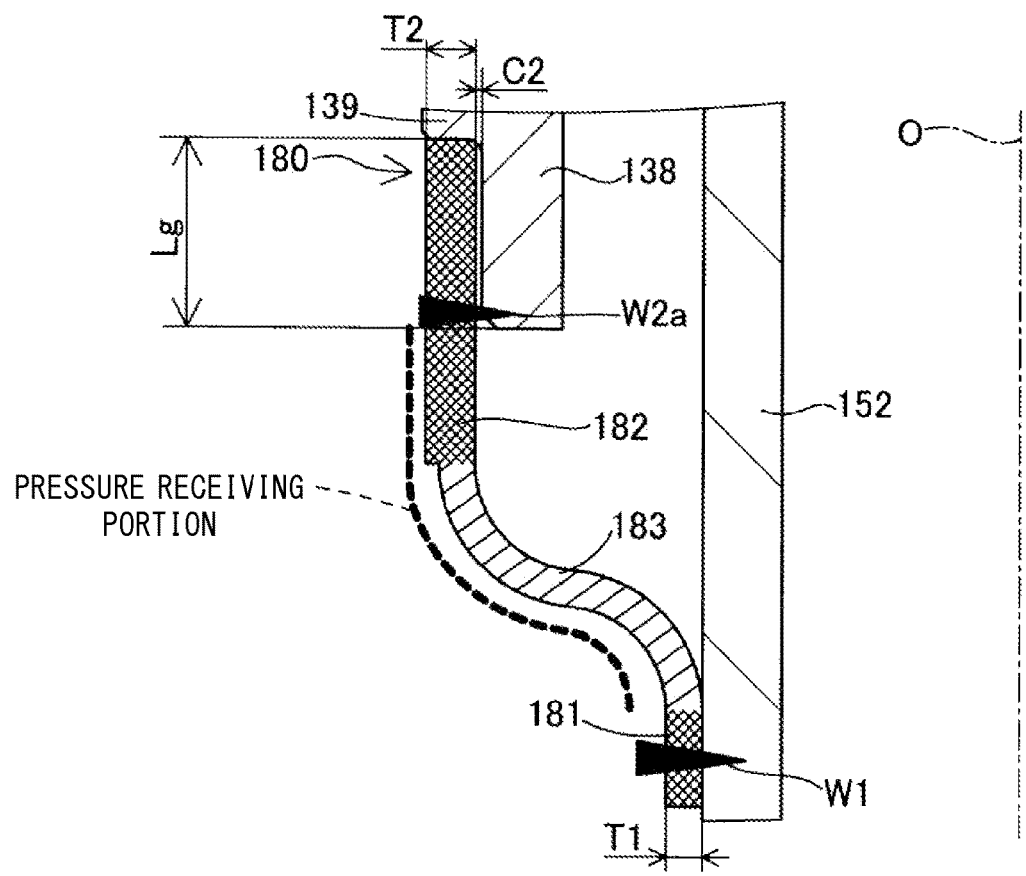
FIG. 5 Cross-sectional view of a gap forming portion, a part of a sheath tube, and a variable member (Embodiment 3).

Embodiment 3 will be described. FIG. 5 is a cross-sectional view of the gap forming portion 138, a part of the sheath tube 152, and the variable member 180. A glow plug of Embodiment 3 is the same as the glow plug 100 of Embodiment 1 except for the position of a welded portion W2a.

As shown in FIG. 5, in Embodiment 3, the position of connection between the second portion 182 and the gap forming portion 138 by the welded portion W2a is located at the front end of the gap forming portion 138. Thus, the position of the connection by the welded portion W2a can be represented as "a position shifted from the front end surface of the step portion 139 toward the front side by a length which is 100% of the length Lg, with the front end surface of the step portion 139 as a reference".

According to Embodiment 3, the length of a portion of the second portion 182 which portion functions as a pressure receiving portion is shorter than that in Embodiment 1, and thus a sensitivity change of the pressure sensor 160 is further suppressed.

The present invention is not limited to the embodiments, examples, and modified embodiments described in the present specification, and can be embodied in various configurations without departing from the gist of the present invention. For example, the technical features in the embodiments, examples, and modified embodiments corresponding to the technical features in each mode described in the Summary of the Invention section can be appropriately replaced or combined to solve some of or all of the foregoing problems, or to achieve some of or all of the foregoing effects. Further, such technical features may be appropriately deleted if not described as being essential in the present specification. For example, the following is exemplified.

The present invention may be applied to a pressure sensor which replaces the heater portion 150 with a rod-shaped member not having a heater function and thus does not have a function as a glow plug.

The present invention may be applied to a glow plug with a pressure sensor which replaces the heater portion 150 with a ceramic heater and thus includes the ceramic heater.

The shape of the variable member may be changed. For example, the thicknesses of the first portion and the bent portion may not be uniform. The thickness of the bent portion may be entirely equal to the thickness of the second portion, or may change stepwise.

In the case where the thickness of the first portion is not uniform, the second portion being thicker than the first portion is defined to mean that, for example, the second portion is thicker than the average of the thickness of the first portion.

In Embodiment 1, at the boundary between the second portion and the bent portion, the step is formed on the outer peripheral surface, but a step may be formed on the inner peripheral surface, or a step may be formed on each of the inner and outer peripheral surfaces.

The criterion for determining whether the thickness of the second portion is uniform may be any value, and may be, for example, a range of ±10% or a range of ±20%.

The gap forming portion may be a portion integrated with the housing.

The variable member may be connected directly to the heater portion or may be connected to the heater portion via another member.

The variable member may be connected directly to the gap forming portion or may be connected to the gap forming portion via another member.

The weld to form the welded portion W2 may not be performed over the entire circumference of the second portion and may be performed on a part of the circumference.

The position of the connection by the welded portion W2 may be any position. For example, the position of the connection by the welded portion W2 may be a position shifted from the front end surface of the step portion 139 toward the front side by a length less than 50% of the length Lg of the gap forming portion 138 in the axial direction OD, with the front end surface of the step portion 139 as a reference.

DESCRIPTION OF REFERENCE NUMERALS

100: glow plug
110: metallic shell
114: screw portion
120: cap portion
122: cylindrical portion
124: tapered portion
125: opening portion
130: housing
132: sensor fixing member
133: flange portion
134: transmission sleeve
138: gap forming portion
139: step portion
140: protection tube
142: tool engagement portion
144: terminal spring
146: metal terminal
148: connector member
150: heater portion
151: control coil
152: sheath tube
154: heat generation coil
155: insulating powder
156: seal member
160: pressure sensor
161: opening portion
162: metal diaphragm
164: piezoresistor
170: center shaft
180: variable member
180a: variable member
181: first portion
182: second portion
183: bent portion
183a: bent portion
C1, C2: clearance
O: axis
OD: axial direction
W1, W2, W2a: welded portion

The invention claimed is:

1. A pressure sensor comprising:
a rod-shaped member extending along an axial direction;
a tubular housing within which the rod-shaped member is disposed in a state where a front end of the rod-shaped member projects therefrom;
a variable member disposed entirely within the housing, connected to the housing and the rod-shaped member, and configured to deform when the rod-shaped member is displaced relative to the housing along the axial direction; and
an element, disposed at a rear side with respect to the variable member and within the housing, for measuring a pressure around the front end of the rod-shaped member on the basis of the displacement, wherein
the variable member includes a first portion connected to the rod-shaped member, a second portion connected to the housing, and a bent portion which connects the first portion and the second portion to each other and has a bent shape,
at least a portion of the second portion is a pressure receiving portion which displaces the rod-shaped member in the axial direction when receiving the pressure,
the pressure receiving portion of the second portion has a substantially uniform thickness, and
the thickness of the pressure receiving portion of the second portion is larger than that of the first portion; and
a clearance is present between an inner peripheral surface of the tubular housing and an entire outer peripheral surface of the second portion.

2. The pressure sensor according to claim 1, wherein the rod-shaped member is a heater which generates heat when being energized.

3. The pressure sensor, as claimed in claim 1, wherein
the bent portion is the pressure receiving portion, and
the bent portion has a substantially uniform thickness smaller than the thickness of the pressure receiving portion of the second portion.

4. The pressure sensor, as claimed in claim 1, wherein
the bent portion is the pressure receiving portion, and
the bent portion has a thickness which gradually decreases from a connection portion with the second portion to a connection portion with the first portion.

5. The pressure sensor, as claimed in claim 1, wherein
the housing includes, at a front side in the axial direction, a housing body portion and a tubular housing tube portion which is disposed with a gap from an inner wall of the housing body portion and has a rear end connected to the housing body portion,
the variable member is connected to the housing tube portion,
a rear end portion of the variable member extends from the front side of the gap toward the rear side of the gap,
a position of the connection between the housing tube portion and the variable member in the axial direction is a position shifted from a rear end of the gap toward the front side by a predetermined length or a position at the front side with respect to the position shifted by the predetermined length, and
the predetermined length is a length which is 50% of a length of the gap in the axial direction.

6. The pressure sensor, as claimed in claim 1, wherein the variable member is formed by deep drawing.

7. The pressure sensor, as claimed in claim 1, wherein an inner peripheral surface of the variable member consists of a surface which extends straight in parallel to the axial direction and a surface which faces rearward of the axial direction.

8. The pressure sensor, as claimed in claim 1, wherein a step is formed on the outer peripheral surface of the second portion at a boundary between the second portion and the bent portion.

\* \* \* \* \*